June 28, 1966  M. R. SIMONSON  3,258,206
THRUST DEFLECTOR
Filed Jan. 9, 1964  2 Sheets-Sheet 1
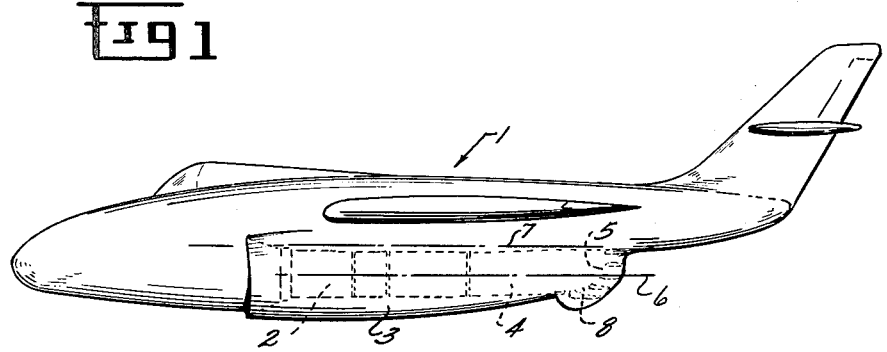
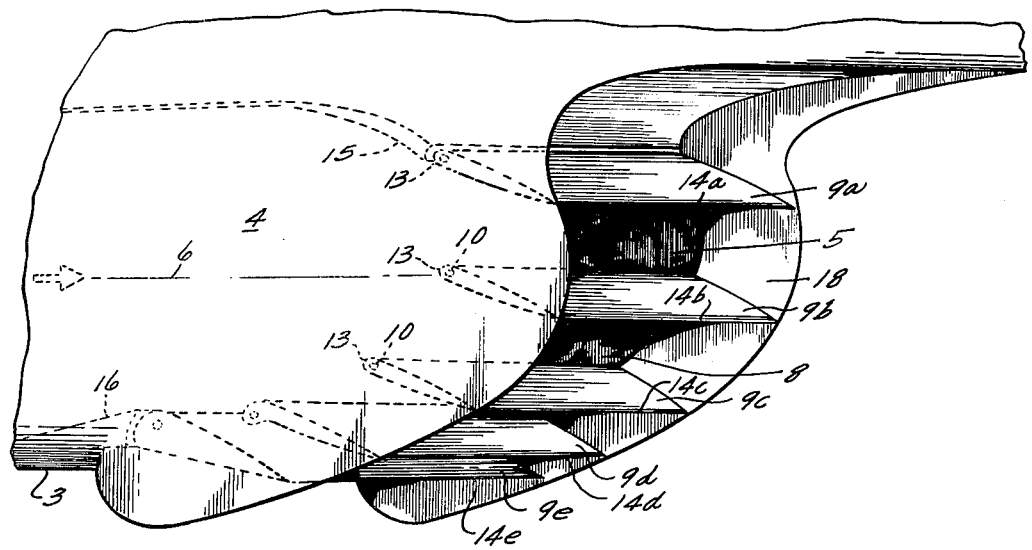
INVENTOR.
MARVIN R. SIMONSON
BY
ATTORNEY June 28, 1966  M. R. SIMONSON  3,258,206
THRUST DEFLECTOR Filed Jan. 9, 1964  2 Sheets-Sheet 2

INVENTOR.
MARVIN R. SIMONSON
BY John F. Cullen
ATTORNEY

Patent text

United States Patent Office 3,258,206
Patented June 28, 1966

3,258,206
THRUST DEFLECTOR
Marvin R. Simonson, Fairfield, Ohio, assignor to General Electric Company, a corporation of New York
Filed Jan. 9, 1964, Ser. No. 336,823
6 Claims. (Cl. 239—265.27)

This invention relates to a thrust control device for use in a vertical take-off and landing (VTOL) aircraft, and, more particularly, to fluid deflection means positioned in the exhaust outlet of a fluid propulsion engine.

A VTOL aircraft generally includes a fluid propulsion engine whose direction of thrust may be oriented to establish vertical thrust during ascent, descent, or hovering. Thrust orienting means which are suggested in the prior art include means for pivoting the entire engine about a horizontal axis so as to direct the thrust downwardly. Fans have also been used in a similar, pivoting fashion, or have been immovably mounted in the wing surfaces and powered by trip turbines or similar means. However, in aircraft designed for high speed flight, the attendant increase in weight incurred by the added pivoting means, the additional fan means, or the ofttimes cumbersome design of tiltable engines has tended to reduce the efficiency of operation and the limit of attainable speed.

In order to overcome the above-mentioned difficulties, thrust deflecting means are provided within the exhaust outlet of a fixedly mounted fluid propulsion motor. The deflecting means, when disposed parallel to the fluid flow path or streamline, should allow for normal engine operation in high speed, horizontal flight. When in the deflecting position, the deflecting means should provide a smooth flow of fluid downwardly and in some instances forwardly to a limited degree for reverse thrust. The prior art deflecting means consist of a plurality of pivotable vanes whose pivot axes are horizontally disposed and positioned along a straight line in a forwardly and downwardly slanting plane in the fluid motor exhaust oulet. There are, however, attendant difficulties in a straight line or planar positioning of the vane pivot axes which include the inability to maintain a smooth flow over the vanes during all angles of deflection. Inherently, in one of the blade positions, a high angle of attack is necessitated between the vanes and the fluid streamlines with the result that separation occurs between the fluid streamlines and the vane surfaces. More particularly, when the vane pivot axes are arranged in a straight line, a high angle of attack is caused by the inabality of two or more of the vanes to provide a smooth curved surface over which the fluid may be smoothly deflected and directed toward the remaining vanes at a low angle of attack.

When the vane pivot axes are arranged along a straight line, the high angle of attack problem cannot be remedied by cambering the vanes. A cambered vane would allow smooth flow when in a deflecting position, but the cambered portion would then present a greater obstruction to fluid flow when oriented in a non-deflecting position. Conversely, a non-cambered vane is satisfactory when oriented in a non-deflecting position but there is greater fluid flow separation when it is positioned in a deflecting position if there is no provision for directing fluid toward the non-cambered vane at a low angle of attack.

The present invention overcomes these difficulties of the prior art and achieves a greater degree of thrust efficiency by preserving laminar flow and eliminating separation between the fluid flow and deflecting vanes in all positions of the vanes.

It is therefore an object of this invention to provide an improved means for deflecting the motive fluid of a VTOL aircraft so that in all deflecting vane positions a low angle of attack is maintained between the vanes and the laminar fluid flow lines.

Another object of this invention is to provide an improved means for deflecting motive fluid of a VTOL aircraft so that separation does not occur between the fluid streamlines and the deflecting vanes while in any position.

An additional object is to provide a lightweight means for effectively deflecting exhaust fluid in a VTOL aircraft.

Further objects and advantages will become apparent as the following description proceds and the features of novelty are pointed out in the claims annexed to and forming part of this specification.

In carrying out the invention in one form thereof, thrust deflection means are disposed within the end of a fluid motor exhaust outlet and within the confines of the fuselage or cowling in such a manner that the deflecting vanes preferably are pivotable about horizontally disposed parallel axes near the leading edge of the respective vanes.

More particularly, the vane pivot axes are arranged perpendicular to a curved line. To illustrate, the mutually parallel axes may be considered as disposed within a curved plane which curves from the contour of the outlet top wall to the contour of the outlet bottom wall, that is, it forms a generally smooth extension of the contour of both these walls. The smooth curvature along which the vane pivot axes are disposed allows for the formation of a smooth extension when two or more of the vanes are pivoted so that the trailing edge of one vane abuts the leading edge of an adjacent vane. The smooth extension enables the fluid flow to remain laminar while being directed at a low angle of attack to the remaining deflecting vanes.

For a better understanding of the invention, reference is made to the accompanying drawings in which:

FIG. 1 indicates an aircraft incorporating one embodiment of a fluid-deflecting device in accordance with this invention;

FIG. 2 is a perspective view of the fluid-deflecting device of FIG. 1 illustrating the deflecting vanes positioned in a semi-deflecting position;

Figure 4:
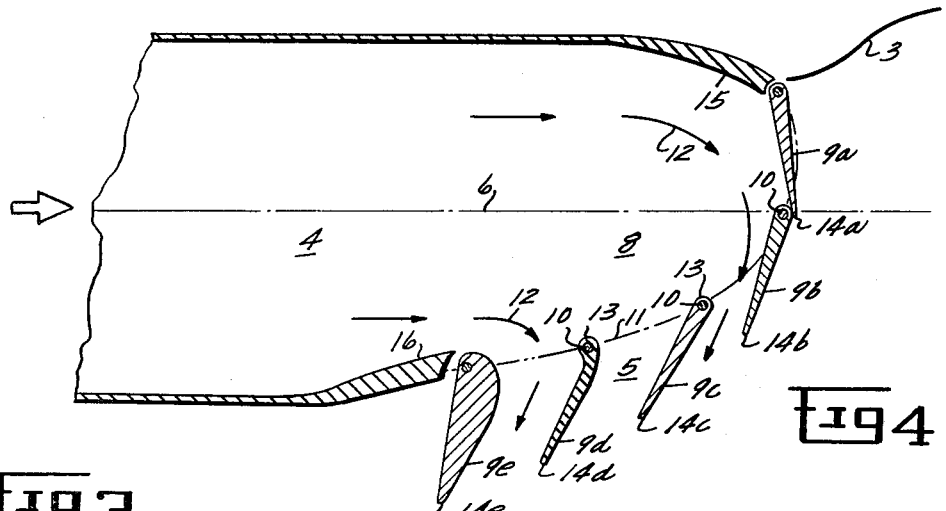
FIG. 4 is a sectional view similar to FIG. 3 except that the vanes are disposed in a deflecting position.

Referring to FIG. 1, an aircraft 1 is indicated having a fluid propulsion motor 2 mounted within the aircraft fuselage or engine cowling 3. The fluid propulsion motor 2 includes an exhaust conduit 4 having an exhaust outlet 5. The exhaust outlet 5 has a longitudinal axis 6 which is essentially parallel to the fuselage axis 7. At the exhaust outlet 5 is a cutaway portion 8 in the bottom side and which extends downwardly through the exhaust conduit 4 and the fuselage 3. The cuatway portion allows for the downward deflection of exhaust fluid which normally passes rearwardly through the exhaust conduit 4. A plurality of deflecting vanes are arranged within the exhaust outlet 5 and can be pivoted so as to deflect the exhaust fluid downwardly through the cutaway portion 8.

The overall position of the deflecting vanes relative to the fuselage 3 and the exhaust outlet 5 may be appreciated by reference to FIG. 2. The deflecting vanes 9a, 9b, 9c, 9d and 9e are horizontally disposed in spaced relationship across the exhaust outlet 5. In addition, the vanes are essentially confined within the sidewalls 18 of the fuselage or engine cowling 3 during all pivotal positions. Conventional deflecting vane pivoting means are employed to pivot the deflecting vanes 9a–e about their pivot axes 10.

Figure 3:
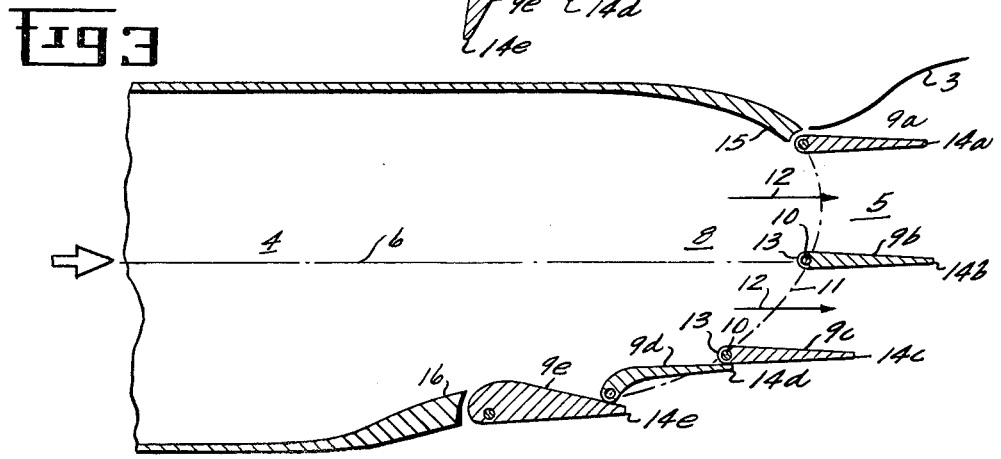
FIG. 3 is a sectional view in which the deflecting vanes are disposed in a non-deflecting position.

The specific positioning of the vanes 9a–e and vane pivot axes 10 can be better appreciated by reference to FIGS. 3 and 4. The deflecting vanes 9a–e are pivotably mounted on deflecting vane pivot axes 10 which are disposed longitudinally of the deflecting vanes adjacent the vane leading edges 13. The pivot axes 10 are mutually parallel and are disposed first in spaced relationship along a curved line 11 between a top wall 15 and a second bottom wall 16 diametrically opposite of the exhaust outlet 5, the curved line 11 being a smooth extension of the contour of the top wall 15 and the bottom wall 16. The pivot axes 10 of the deflecting vanes 9a–e are spaced along the curved line 11 with the distance between adjacent pivot axes being approximately equal to the chord of the adjacent vanes. When two or more of the vanes are pivoted so that their respective trailing edges abut the leading edges 13 of adjacent vanes, a smooth surface or curved extension of the contour of the top wall 15 or bottom wall 16 is formed. This ability to provide a smooth extension of the contour of either the top wall 15 or the bottom wall 16 when the pivot axes are arranged along a curved line which is a smooth extension of the contour of the top wall 15 and the bottom wall 16 enables the fluid flow streamlines 12 to be more smoothly deflected at a low angle of attack to the vanes.

FIG. 3 illustrates the vane positions during normal, horizontal flight. The vane 9e is pivoted so that its trailing edge 14e abuts the vane leading edge 13 of the deflecting vane 9d. Likewise, the trailing edge 14d of the deflecting vane 9d abuts the leading edge 13 of the deflecting vane 9c. Hence, the surface which is formed by the deflecting vanes 9c–e is a smooth extension of the contour of the bottom wall 16 and permits smooth laminar flow outwardly through the exhaust outlet 5 and parallel to the longitudinal exhaust outlet axis 6 while maintaining a low angle of attack relative to the deflecting vanes 9a–c.

When the blades are oriented in the deflecting position as illustrated in FIG. 4, the deflecting vane 9a is pivoted so that its trailing edge 14a abuts the leading edge 13 of the vane 9b. The vane 9b is pivoted downwardly and cooperates with the vane 9a to form a smooth surface which is an extension of the contour of the top wall 15. The smooth surface formed thereby gradually directs the fluid flow streamlines 12 downwardly through the exhaust outlet 5 and at a low angle of attack to the remaining deflecting vanes 9c–e. The remaining deflecting vanes 9c–e may be pivoted downwardly and forwardly so as to establish a downwardly and forwardly directed thrust axis for both lift and reverse thrust.

Figure 5:
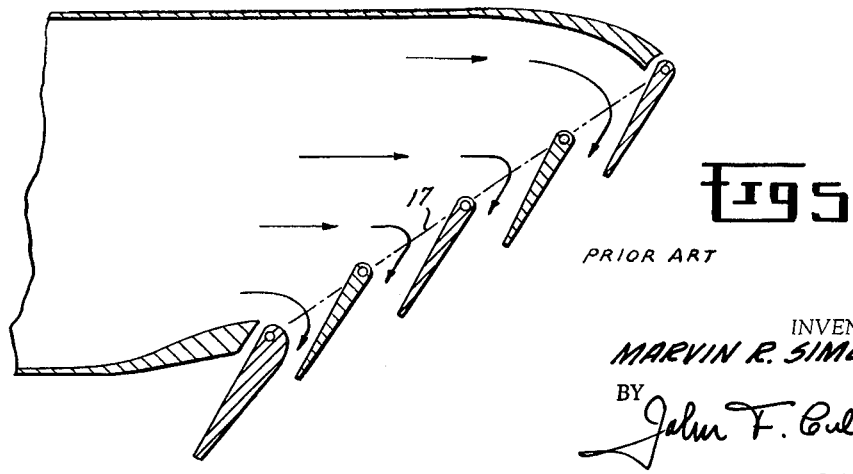
FIG. 5 illustrates the prior art positioning of the vane pivot axes along a straight line.

It can be appreciated by reference to FIGS. 3 and 4 that, by virtue of the curved line positioning of the vane pivot axes 10, the deflecting vanes 9a–e may be oriented to provide a smooth extension of the contour of either the top wall 15 or the bottom wall 16 of the exhaust outlet and, thereby, preserve laminar flow by gradually changing the flow direction. Also, by changing the flow direction toward the other deflecting vanes, a low angle of attack is also preserved and the consequent loss of efficiency through fluid flow separation and turbulence is avoided. The improved result of the curved line positioning of the deflecting vanes can be better appreciated by referring to FIG. 5 which illustrates the conventional, straight line 17 vane positioning. It may be noted from FIG. 5 that the straight line arrangement of vane pivot axes cannot provide smooth surfaces needed for directing laminar flow at a low angle of attack to the deflecting vanes during all positions of deflection.

Although the present invention has been described as applied to fluid propulsion motors mounted within the aircraft fuselage for deflecting fluid downwardly as disclosed in the preferred embodiment, the invention is also clearly applicable to wing-mounted motors, to outboard-mounted motors at the rear portion of the fuselage, and to other aircraft powerplant arrangements. In addition, it is also not intended that the deflecting means be exclusively employed for downwardly directed thrust, but that the deflecting means may be employed for horizontal deflection for turning the aircraft about a vertical axis while hovering.

It is intended, therefore, that while a specific embodiment of this invention has been shown and described, it is not desired that the invention be limited to the particular construction shown and described and it is intended by the appended claims to cover all modifications within the spirit and scope of this invention.

I claim:
1. A device for controlling the thrust direction in a VTOL aircraft which comprises,
   a fluid propulsion motor for mounting on an aircraft,
   an exhaust outlet for said fluid propulsion motor,
   the normal fluid flow through said exhaust outlet being generally parallel to the longitudinal axis of said exhaust outlet,
   said exhaust outlet having a cutaway portion in the bottom side through which said fluid flow can be deflected downwardly from said outlet axis,
   a plurality of deflecting vanes pivotally mounted in said exhaust outlet at said cutaway portion for pivotal movement,
   said vanes being pivotally mounted on fixed axes disposed longitudinally of said vanes for pivoting about said axes between deflecting and non-deflecting positions,
   said pivot axes being mutually parallel and spaced across said exhaust outlet along a curved line between the top and bottom walls of said outlet,
   said curved line being a smooth extension of the contour of said top and bottom walls of said outlet.

2. A device for controlling the thrust direction in a VTOL aircraft which comprises,
   a fluid propulsion motor for mounting on an aircraft,
   an exhaust outlet for said fluid propulsion motor,
   the normal fluid flow through said exhaust outlet being generally parallel to the longitudinal axis of said exhaust outlet,
   said exhaust outlet having a cutaway portion in the bottom side through which said fluid flow can be deflected downwardly from said outlet axis,
   a plurality of deflecting vanes pivotally mounted in said exhaust outlet at said cutaway portion for pivotal movement,
   said vanes being pivotally mounted on fixed axes disposed longitudinally of said vanes and adjacent the leading edge of said vanes for pivoting about said axes between deflecting and non-deflecting positions,
   said pivot axes being mutually parallel and spaced across said exhaust outlet along a curved line between the top and bottom walls of said outlet,
   said curved line being a smooth extension of the contour of said top and bottom walls of said outlet,
   at least two of said vanes adjacent said top wall being arranged for engagement when said vanes are in a deflecting position to provide a smooth curved extension of said top wall contour over which said fluid flow is deflected downwardly at a low angle of attack to the remaining vanes.

3. A device for controlling the thrust direction in a VTOL aircraft which comprises,
   a fluid propulsion motor for mounting on an aircraft,
   an exhaust outlet for said fluid propulsion motor,
   the normal fluid flow through said exhaust outlet being generally parallel to the longitudinal axis of said exhaust outlet,
   said exhaust outlet having a cutaway portion in the bottom side through which said fluid flow can be deflected downwardly from said outlet axis, a plurality of deflecting vanes pivotally mounted in said exhaust outlet at said cutaway portion for pivotal movement, said vanes being pivotally mounted on fixed axes disposed longitudinally of said vanes and adjacent the leading edge of said vanes for pivoting about said axes between deflecting and non-deflecting positions, said pivot axes being mutually parallel and spaced across said exhaust outlet along a curved line between the top and bottom walls of said outlet, said curved line being a smooth extension of the contour of said top and bottom walls of said outlet, at least two of said vanes adjacent said top wall being arranged for engagement when said vanes are in a deflecting position to provide a smooth curved extension of said top wall contour over which said fluid flow is deflected downwardly at a low angle of attack to the remaining vanes, and at least two of said vanes adjacent said bottom wall being arranged for engagement when said vanes are in a non-deflecting position to provide a smooth curved extension of said bottom wall adjacent said cutaway portion over which said fluid flow may be directed parallel to said outlet axis.

4. A device for controlling the thrust direction in a VTOL aircraft as set forth in claim 2 in which said vanes, when in the deflecting position, deflect said fluid flow downwardly and forwardly for both vertical lift and reverse thrust.

5. A device for controlling the thrust direction in a VTOL aircraft which comprises, a fluid propulsion motor for mounting on an aircraft,
an exhaust outlet for said fluid propulsion motor,
the normal fluid flow through said exhaust outlet being generally parallel to the longitudinal axis of said exhaust outlet, said exhaust outlet including a first wall and a diametrically opposite second wall and having a cutaway portion in said second wall through which said fluid flow can be deflected outwardly from said outlet axis, a plurality of deflecting vanes pivotally mounted in said exhaust outlet at said cutaway portion for pivotal movement, said vanes being pivotally mounted on fixed axes disposed longitudinally of said vanes for pivoting about said axes between deflecting and non-deflecting positions, said pivot axes of said vanes being mutually parallel and spaced across said exhaust outlet along a curved line between said first wall and said second wall, said curved line being a smooth extension of the contour of said first and second walls of said outlet, at least two of said vanes positioned along said curved line adjacent said first wall being arranged for engagement when said vanes are in a deflecting position to provide a smooth curved extension of the contour of said first wall over which said fluid flow is deflected outwardly from said outlet axis and at a low angle of attack to the remaining vanes, and at least two of said vanes adjacent said second wall being arranged for pivotal engagement when said vanes are in a non-deflecting position to provide a smooth curved extension of the contour of said second wall over which said fluid flow may be directed parallel to said outlet axis.

6. A device for controlling the thrust direction of a VTOL aircraft which comprises, a fluid propulsion motor for mounting on an aircraft,
an exhaust outlet for said fluid propulsion motor,
said outlet having a top wall, a bottom wall, and side walls,
the normal fluid flow through said exhaust outlet being generally parallel to the longitudinal axis of said exhaust outlet, said exhaust outlet having a cutaway portion in the bottom wall through which said fluid flow can be deflected downwardly and forwardly from said outlet axis, a plurality of deflecting vanes pivotally mounted in said exhaust outlet at said cutaway portion for pivotal movement, said deflecting vanes and said exhaust outlet being disposed substantially within the confines of said side walls, said vanes being pivotally mounted on fixed pivot axes disposed longitudinally of said vanes and adjacent the leading edge of said vanes for pivoting about said axes between deflecting and non-deflecting positions, said pivot axes being mutually parallel and spaced across said exhaust outlet along a curved line between said top and bottom walls of said outlet, said curved line being a smooth extension of the contour of said top and bottom walls of said outlet, at least two of said vanes adjacent said top wall being arranged for engagement when said vanes are in a deflecting position to provide a smooth curved extension of said top wall contour over which said fluid flow is deflected downwardly at a low angle of attack to the remaining vanes, and at least two of said vanes adjacent said bottom wall being arranged for engagement when said vanes are in a non-deflecting position to provide a smooth curved extension of said bottom wall adjacent said cutaway portion over which said fluid flow may be directed parallel to said outlet axis and at a low angle of attack to the remaining vanes.

References Cited by the Examiner

UNITED STATES PATENTS

| | | | |
|---|---|---|---|
| 2,802,333 | 8/1957 | Price et al. | 60—35.54 |
| 2,879,014 | 3/1959 | Smith et al. | 244—12 |
| 3,016,700 | 1/1962 | Howald | 60—35.54 |
| 3,081,597 | 3/1963 | Kosin et al. | 60—35.54 |
| 3,087,303 | 4/1963 | Heinze et al. | 60—35.55 |
| 3,100,377 | 8/1963 | Kosin et al. | 60—35.54 |
| 3,126,171 | 3/1964 | Stepniewski | 244—12 |

FOREIGN PATENTS

| | | |
|---|---|---|
| 1,066,499 | 1/1954 | France. |
| 1,007,179 | 4/1957 | Germany. |

MARK NEWMAN, *Primary Examiner.*

A. L. SMITH, *Assistant Examiner.*